United States Patent [19]

Nishimura

[11] Patent Number: 5,191,788
[45] Date of Patent: Mar. 9, 1993

[54] MISFIRE DETECTION DEVICE FOR AN INTERNAL COMBUSTION ENGINE

[75] Inventor: Yukinobu Nishimura, Himeji, Japan

[73] Assignee: Mitsubishi Denki Kabushiki Kaisha, Tokyo, Japan

[21] Appl. No.: 799,278

[22] Filed: Nov. 27, 1991

[30] Foreign Application Priority Data

Nov. 28, 1990 [JP] Japan .................................. 2-335333
Nov. 28, 1990 [JP] Japan .................................. 2-335429

[51] Int. Cl.$^5$ .......................................... G01M 15/00
[52] U.S. Cl. .......................................... 73/117.3
[58] Field of Search ...................... 73/35, 116, 117.3; 364/431.08

[56] References Cited

U.S. PATENT DOCUMENTS

| | | | |
|---|---|---|---|
| 4,414,840 | 11/1983 | Yamaguchi et al. | 73/654 |
| 4,472,779 | 9/1984 | Marino et al. | 73/117.3 |
| 4,886,029 | 12/1989 | Lill et al. | 73/117.3 |
| 4,932,379 | 6/1990 | Tang et al. | 73/117.3 |
| 4,979,481 | 12/1990 | Shimomura et al. | |
| 5,028,823 | 7/1991 | Watanabe. | |
| 5,044,195 | 9/1991 | James et al. | 73/117.3 |
| 5,127,262 | 7/1992 | Demizu et al. | 73/115 |

FOREIGN PATENT DOCUMENTS 19532 2/1983 Japan.

Primary Examiner—Robert Raevis
Attorney, Agent, or Firm—Sughrue, Mion, Zinn, Macpeak & Seas

[57] ABSTRACT

A misfire detection device for an internal combustion engine determines the time length tx from each ignition timing, as determined by the ignition signal Se, to a predetermined angle of the crank shaft after the ignition timing as determined by the crank angle pulse signal Sd. When the difference between the current and the preceding time lengths thus determined exceeds a reference level, an occurrence of misfire is detected. Alternatively, when the difference $\Delta\omega d$ between the instantaneous angular velocities immediately after the ignition timing and a predetermined angle thereafter as determined on the basis of the crank angle pulse signal Sd is less than a predetermined reference level, an occurrence of misfire is detected.

7 Claims, 11 Drawing Sheets

MISFIRE DETECTION DEVICE FOR AN INTERNAL COMBUSTION ENGINE

BACKGROUND OF THE INVENTION

This invention relates to misfire detection devices for internal combustion engines.

Various systems are already proposed for detecting misfires of internal combustion engines. For example, Japanese Laid-Open Patent (Kokai) No. 58-19532 proposes a device which includes a crank angle sensor and detects the rotational speed at an early and a later stage within the expansion stroke of the respective cylinders of an internal combustion engine. An occurrence of misfire is detected when the rotational speed difference between the early and later stages within the expansion stroke is less than a predetermined level.

The unburnt gas generated by the misfires of the internal combustion engines not only pollute the atmosphere but may react with the catalyst and, creating an abnormally high temperature, burn out the catalyst. Thus, it is necessary to detect an occurrence of misfire as early possible and to repair the malfunctioning parts.

The above conventional method of misfire detection, however, has the following disadvantage. Namely, although, for the purpose of enhancing the detection sensitivity, the rotational speed change over such an interval is detected where the variation of the rotational speed is greatest, the device detects the rotational speed change or deviation at fixed angles of the crank shaft. Thus, the sensitivity of the device is reduced when the ignition timing and hence the interval of time where the rotational speed change is greatest are shifted. It is noted that the ignition timing varies over an operational range of about 50 degrees width, from about 40 degrees before top dead center (BTDC) to 10 degrees after top dead center (ATDC) depending on the rpm and the load of the engine.

SUMMARY OF THE INVENTION

It is therefore an object of this invention to provide misfire detection device for an internal combustion engine which is capable of detecting occurrences of misfires over a wide operational range of the engine with an enhanced sensitivity.

The above object is accomplished in accordance with the principle of a first aspect of this invention by misfire detection device for an internal combustion engine including ignition signal generation means for generating an ignition timing signal for controlling ignition timings of the internal combustion engine, said misfire detection device comprising: crank angle signal generation means for generating pulses at predetermined angular intervals of a crank shaft of said internal combustion engine; time measurement means for measuring a time length from each ignition timing as determined on the basis of said ignition timing signal, to a predetermined crank angle after said ignition timing, as determined on the basis of said pulses of said crank angle signal generation means; and misfire detection means for detecting an occurrence of misfire on the basis of a variation of said time length measured by said time measurement means.

Preferably, said misfire detection means includes: means for calculating a difference between said time lengths of a current and a preceding ignition cycle as measured by said time measurement means; and means for comparing said difference with a predetermined reference level, wherein an occurrence of misfire is detected when said difference exceeds said reference level. Alternatively, said misfire detection means includes: means for determining each rotation period of said crank shaft; calculation means for calculating a ratio of said time length as measured by said time measurement means, to a rotation period; means for calculating a difference between said ratios of a current and a preceding ignition cycle as calculated by said calculation means; and means for comparing said difference with a predetermined reference level, wherein an occurrence of misfire is detected when said difference exceeds said reference level.

According to a second aspect of this invention, the misfire detection device for an internal combustion engine comprises: crank angle signal generation means for generating pulses at predetermined angular intervals of a crank shaft of said internal combustion engine; angular velocity determining means for determining an instantaneous angular velocity of a crank shaft of said internal combustion engine on the basis of said pulses generated by said crank angle signal generation means, said angular velocity determining means determining a first angular velocity in the neighborhood of an ignition timing as determined by said ignition timing signal and a second angular velocity at a predetermined crank angle after said ignition timing; and misfire detection means for detecting an occurrence of misfire on the basis of said first and second angular velocities as determined by said angular velocity determining means.

Preferably, said misfire detection means includes: means for calculating a difference between said first and second angular velocity for each ignition cycle of said internal combustion engine; and means for comparing said difference with a predetermined reference level, wherein an occurrence of misfire is detected when said difference is less than said reference level. Alternatively, said misfire detection means includes: means for calculating a ratio of said first and second angular velocity for each ignition cycle of said internal combustion engine; and means for comparing said ratio with a predetermined reference level, wherein an occurrence of misfire is detected when said difference is less than said reference level.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
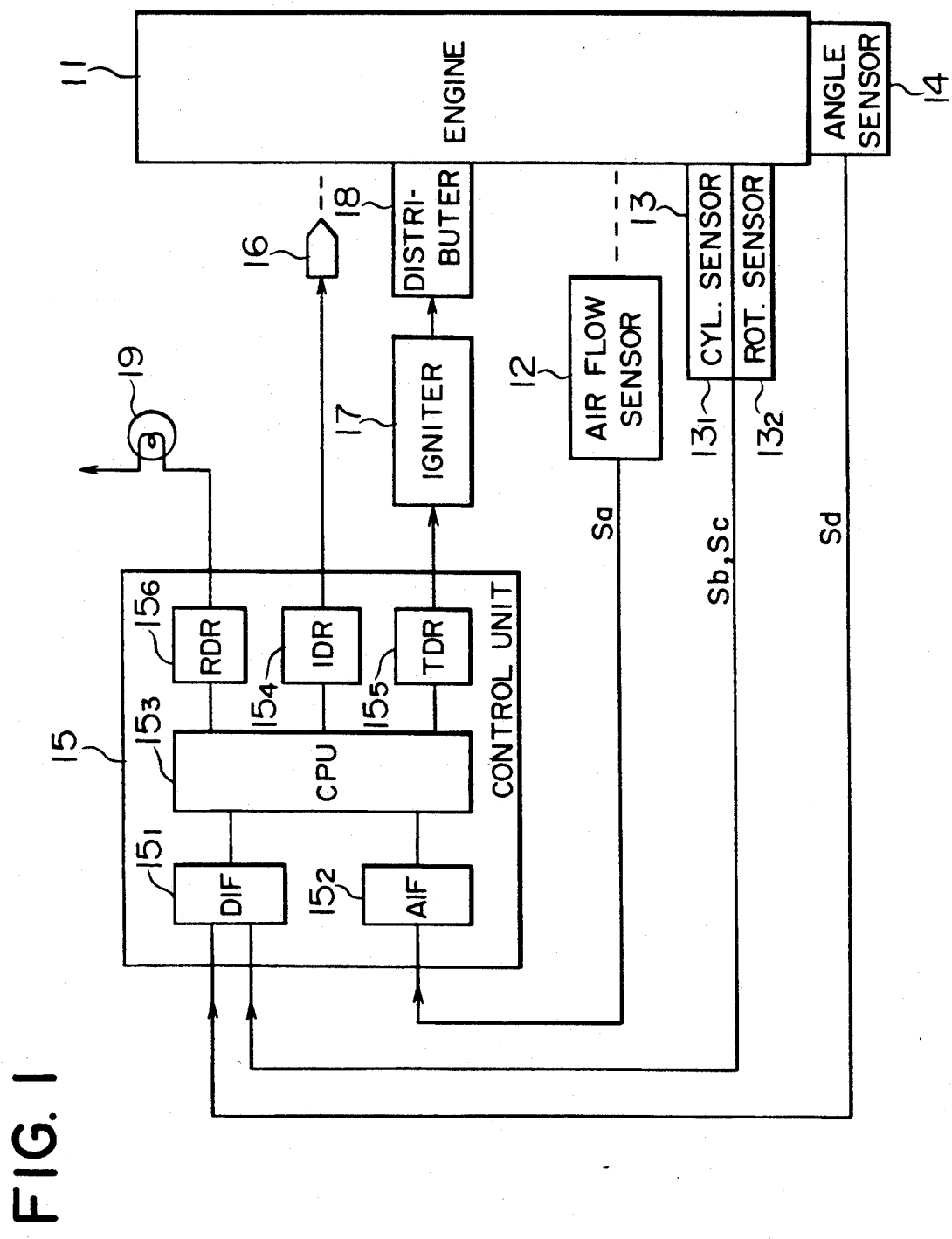
FIG. 1 is a block diagram showing a misfire detection device according to this invention as applied to an electronic control system of an automotive engine.

FIG. 1 is a block diagram showing a misfire detection device according to this invention as applied to an electronic control system of an automotive engine. In FIG. 1, on the air intake path of an automotive four-cylinder gasoline engine 11 is disposed a thermal-type air flow sensor 12. The air flow signal Sa outputted from the thermal-type air flow sensor 12 is supplied to a control unit 15 described below. A sensor unit 13 includes a cylinder distinguishing sensor 131 and a rotation signal sensor 132 which are mounted to the cam shaft of the engine 11 for the purpose of distinguishing the cylinders and obtaining the rotation speed information. The cylinder distinguishing signal Sb of the cylinder distinguishing sensor 131 consists of pulses that are generated one pulse per each rotation of the cam shaft. The rotation signal Sc (see FIG. 2) of the rotation signal sensor 132 consists of cycles of four pulses corresponding to respective four cylinders, wherein the rising and falling edges of the pulses correspond to predetermined angular positions with respect to the respective cylinders. The cylinder distinguishing signal Sb and the rotation signal Sc are supplied to the control unit 15. Further, a crank angle signal generation means 14 is attached to the crank shaft and outputs a pulse Sd per 1 degree of the crank angle (see FIG. 2). The crank angle pulse signal Sd is also inputted to the control unit 15.

The control unit 15 includes: a digital interface 151 to which the cylinder distinguishing signal Sb and the rotation signal Sc are inputted; an analog interface 152 to which the air flow signal Sa, etc., are inputted; a CPU or microcomputer 153 for executing control operations; an injector driver (IDR) 154 for driving an injector 16; an ignition driver (TDR) 155 for driving the ignition devices such as an igniter 17 and a distributor with a built-in coil 18; and an alarm lamp driver (RDR) 156 for driving a misfire detection alarm lamp 19.

The control unit 15 controls optimally the ignition timing and the fuel injection in accordance with the operational state of the engine 11. Further, the control unit 15 determines the time length $t_x$ between the ignition timing (which is determined from the ignition signal Se (see FIG. 2) supplied to ignition devices) and a predetermined crank angle, or the ratio $t_x/T$ where T is the rotation period of the crank shaft. On the basis of the variation of this time length $t_x$ or the ratio $t_x/T$ of the time length $t_x$ to the rotation period T, the control unit 15 determines a misfiring cylinder and detects an occurrence of misfire, as described in detail below. When a misfire is detected, the control unit 15 turns on the misfire detection alarm lamp 19 via the alarm lamp driver (RDR) 156.

Figure 2:
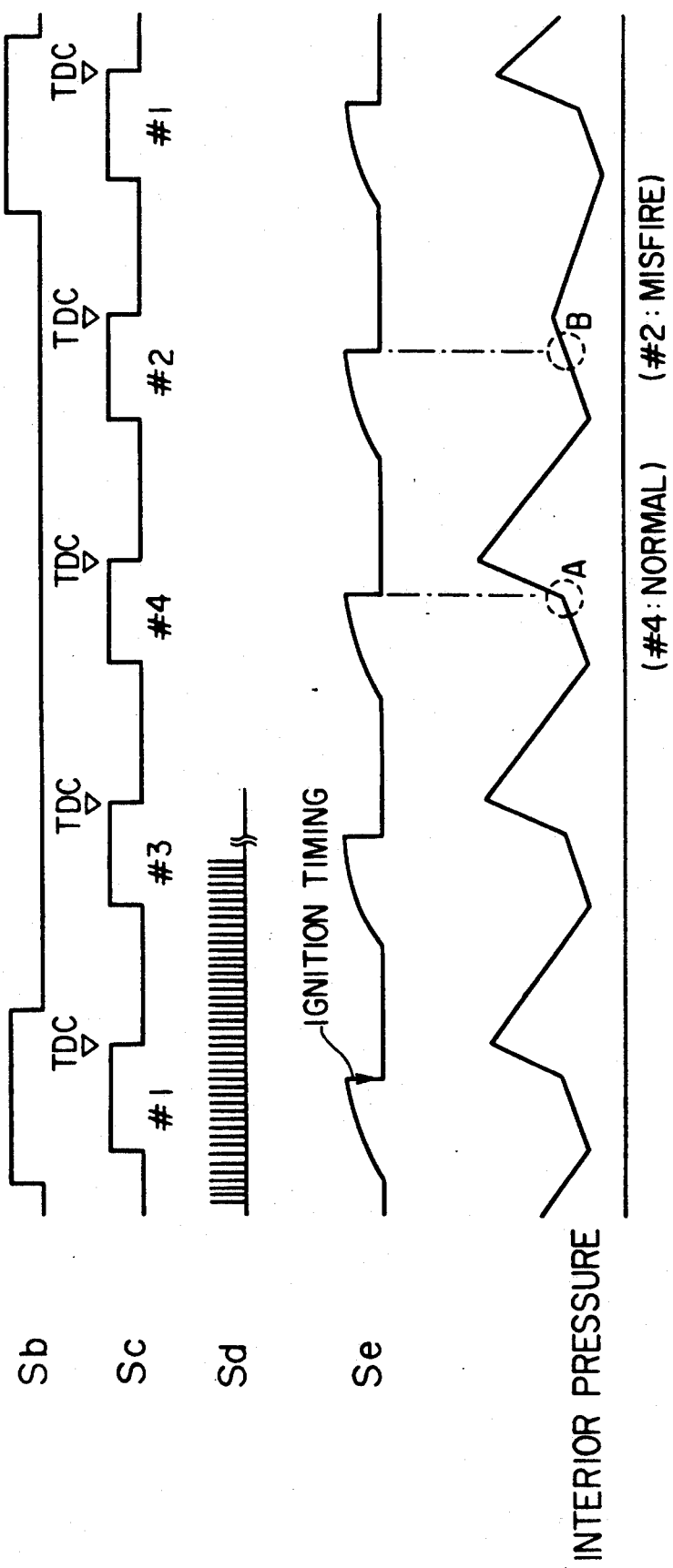
FIG. 2 shows waveforms of the cylinder distinguishing signal Sb, the rotation signal Sc, and the crank angle pulse signal Sd, and the variation of the inner pressure of the cylinders of the engine for the device of FIG. 1.

The control unit 15, or more specifically, the microcomputer 153 determines the top dead center (TDC) between the compression and the expansion strokes of respective cylinders at the trailing edges of the rotation signal Sc as shown in FIG. 2. Further a particular cylinder (cylinder #1 in FIG. 2) is distinguished at the rising edge of rotation signal Sc which coincides with the high level of the cylinder distinguishing signal Sb. Other cylinders are distinguished in succession in accordance with the order of ignition voltage distribution.

As represented by the waveform at the bottom of FIG. 2, the inner pressure within respective cylinders rises rapidly, as shown at A for the cylinder #4, after each ignition when the cylinder in question is normally ignited. On the other hand, when the corresponding cylinder misfires, as shown at B for the cylinder #2 in FIG. 2, the rise of the inner pressure within the cylinder is slow (and hence the increase in the rotational speed is also slow), since the cylinder is ignited at a wrong timing.

Thus, according to this invention, an occurrence of misfire is detected by determining the ignition timing on the basis of the ignition signal Se and measuring the lapse of time $t_x$ from the ignition timing to a predetermined crank angle.

Figure 3:
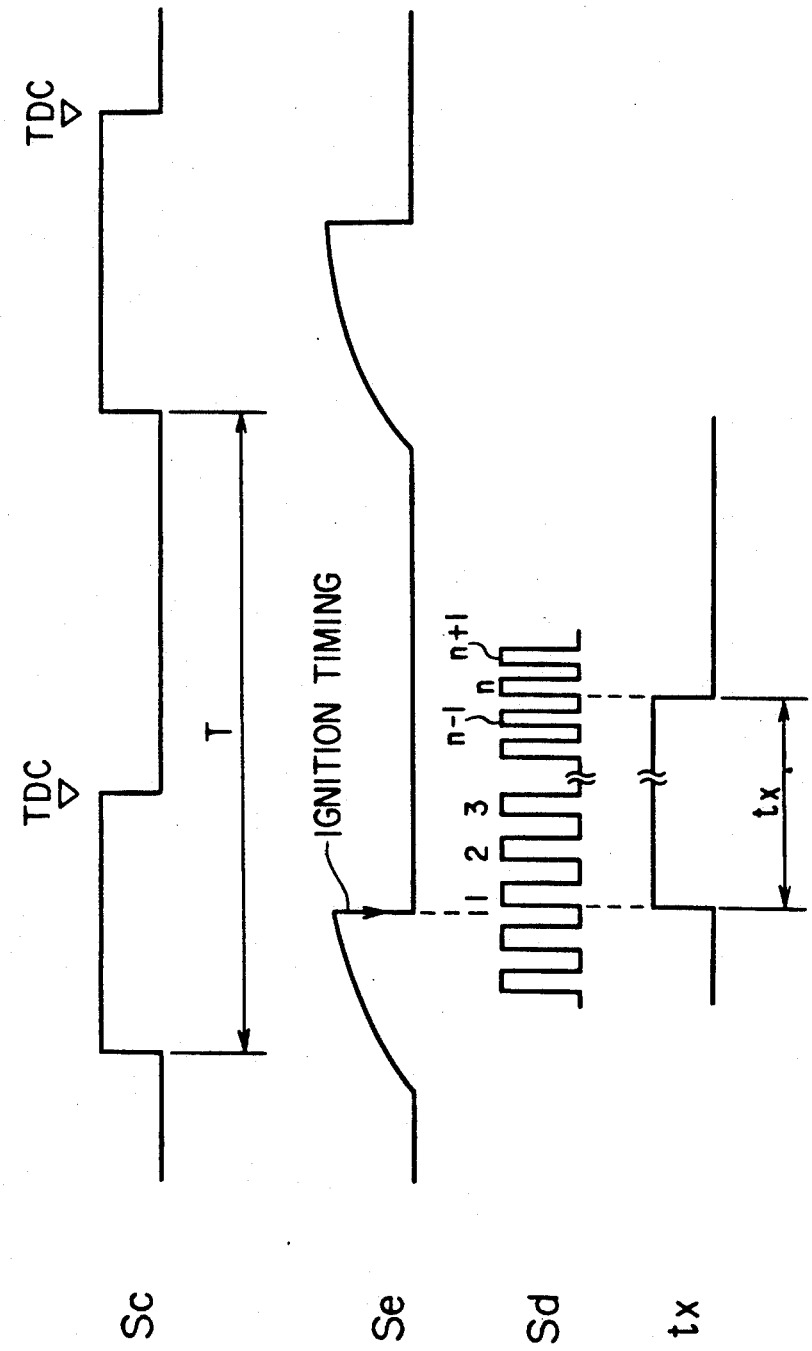
FIG. 3 shows waveforms of the rotation signal Sc, the ignition signal Se, the crank angle pulse signal Sd, together with the time length $t_x$ which is utilized for detecting misfires according to the first aspect of this invention.

FIG. 3 shows waveforms of the rotation signal Sc, the ignition signal Se, the crank angle pulse signal Sd, together with the time length $t_x$ which is utilized for detecting misfires according to the first aspect of this invention. The time length $t_x$ from the ignition timing, as determined by the ignition signal Se, to a predetermined crank angle is measured after each ignition. When the deviation or variation of the time length $t_x$ exceeds a predetermined value, an occurrence of misfire is detected. Alternatively, the ratio $t_x/T$ of the time length $t_x$ to the rotation period T of the rotation signal Sc may be utilized in stead of $t_x$. Then, the ratio $t_x/T$ is calculated for each rotation cycle and when the deviation or variation thereof exceeds a predetermined value, an occurrence of misfire is detected.

Figure 4:
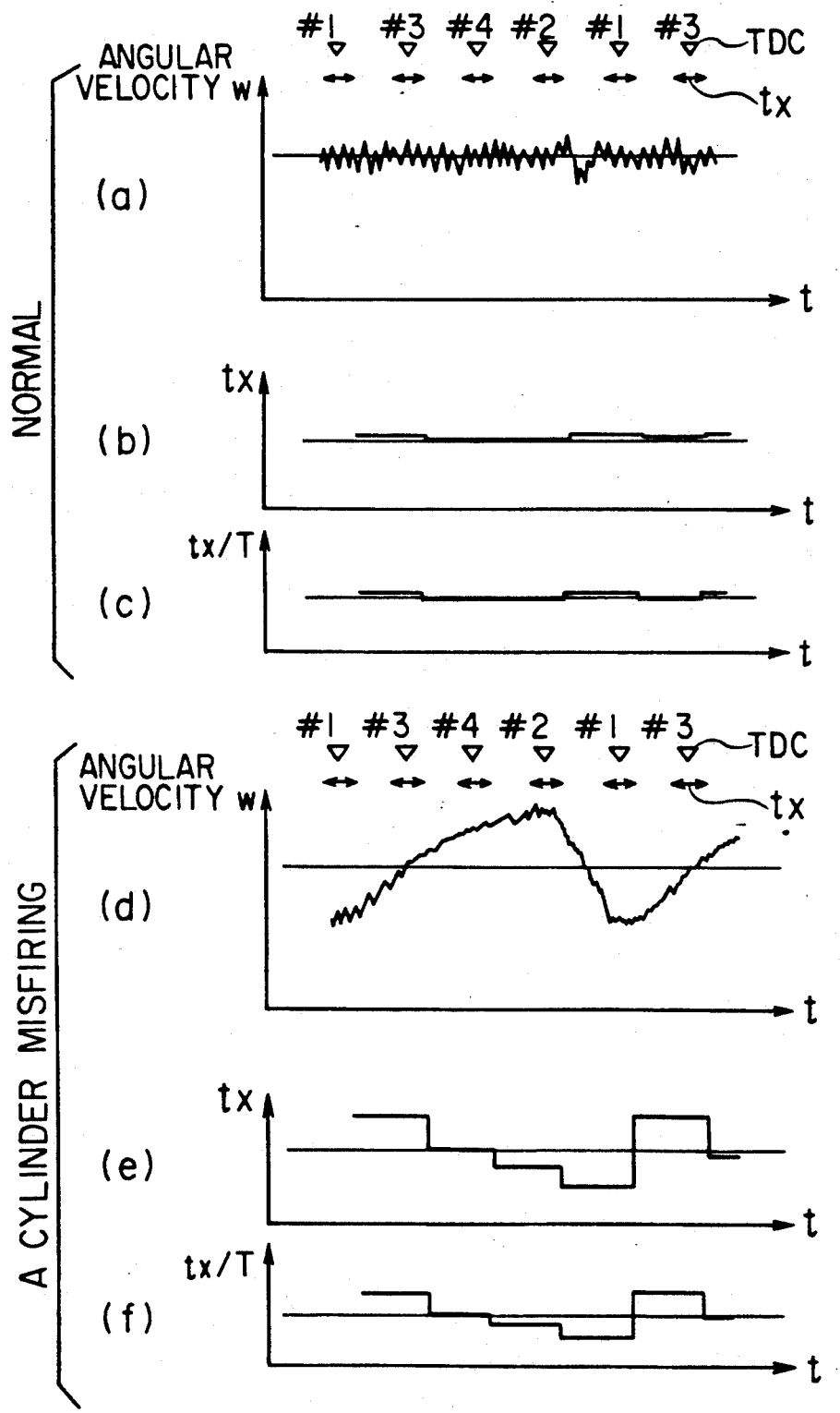
FIG. 4 shows the variations of rotational speed (angular velocity) of the engine and the time length $t_x$ and the ratio $t_x/T$ of the time length $t_x$ to the rotation period T, utilized according to the first aspect of this invention, for the cases where the engine is normal ((a), (b), and (c)) and where a cylinder is misfiring ((d), (e), and (f))

FIG. 4 shows the variations of rotational speed (angular velocity) of the engine and the time length $t_x$ and the ratio $t_x/T$ of the time length $t_x$ to the rotation period T, utilized according to the first aspect of this invention, for the cases where the engine is normal ((a), (b), and (c)) and where a cylinder is misfiring ((d), (e), and (f)). From the waveform of $t_x$ or $t_x/T$ as represented at (e) and (f), it can be determined that the cylinder #2 is misfiring. The deviation or the variation of the time length $t_x$ or the ratio $t_x/T$ increases when a cylinder misfires. Thus, according to the first aspect of this invention, an occurrence of misfire is determined on the basis of the measurement of variation of $t_x$ or $t_x/T$.

Figure 5:
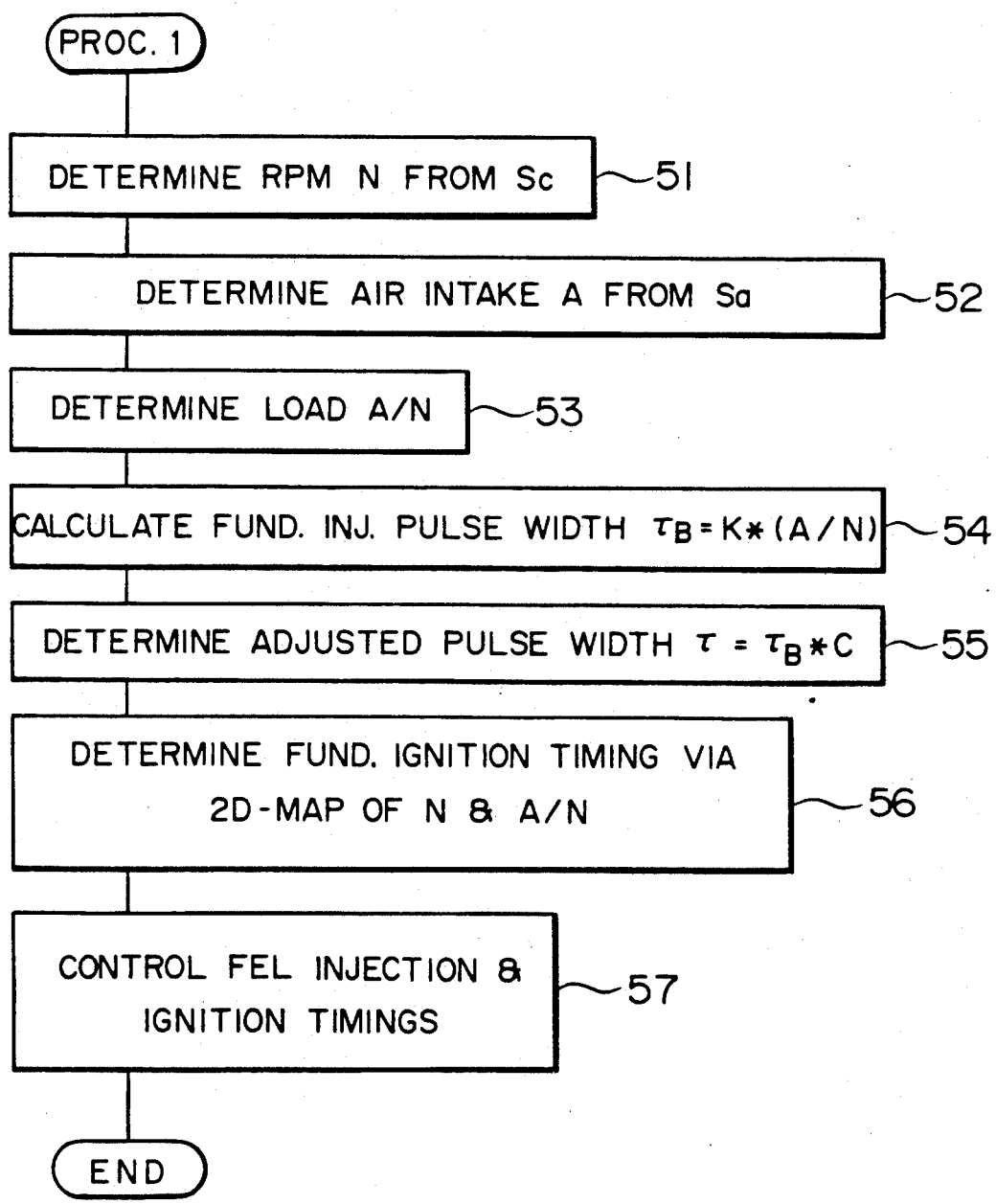
FIG. 5 is a flowchart showing the fuel injection and ignition control of the control unit of this invention.

FIG. 5 is a flowchart showing the fuel injection and ignition control of the control unit of this invention. At step 51, the control unit 15 determines the rpm N of the engine 11 from the period of the rotation signal Sc. Then, at step 52, it determines the air intake amount A by averaging the air flow signal Sa outputted from the thermal-type air flow sensor 12 over the rotation period, and at step 53, calculates the load A/N of the engine 11 by dividing the air intake A by the rpm N.

Further, at step 54, the control unit 15 calculates the fundamental pulse width $\tau_B = K^*(A/N)$ (where K is a constant) of the fuel injection on the basis of the load as determined above, and, at step 55, determines the adjusted injection pulse width $\tau = \tau_B^* C$ (where C is a constant) which is adjusted with respect to various correction factors. Next at step 56, the control unit 15 determines the fundamental ignition timing on the basis of a two-dimensional map with respect to the rpm N and the load A/N of the engine, and, at the subsequent step 57, controls, on the basis of the above determinations, the fuel injection timing of the injector 16 and the ignition timing of the ignition devices.

Figure 6:
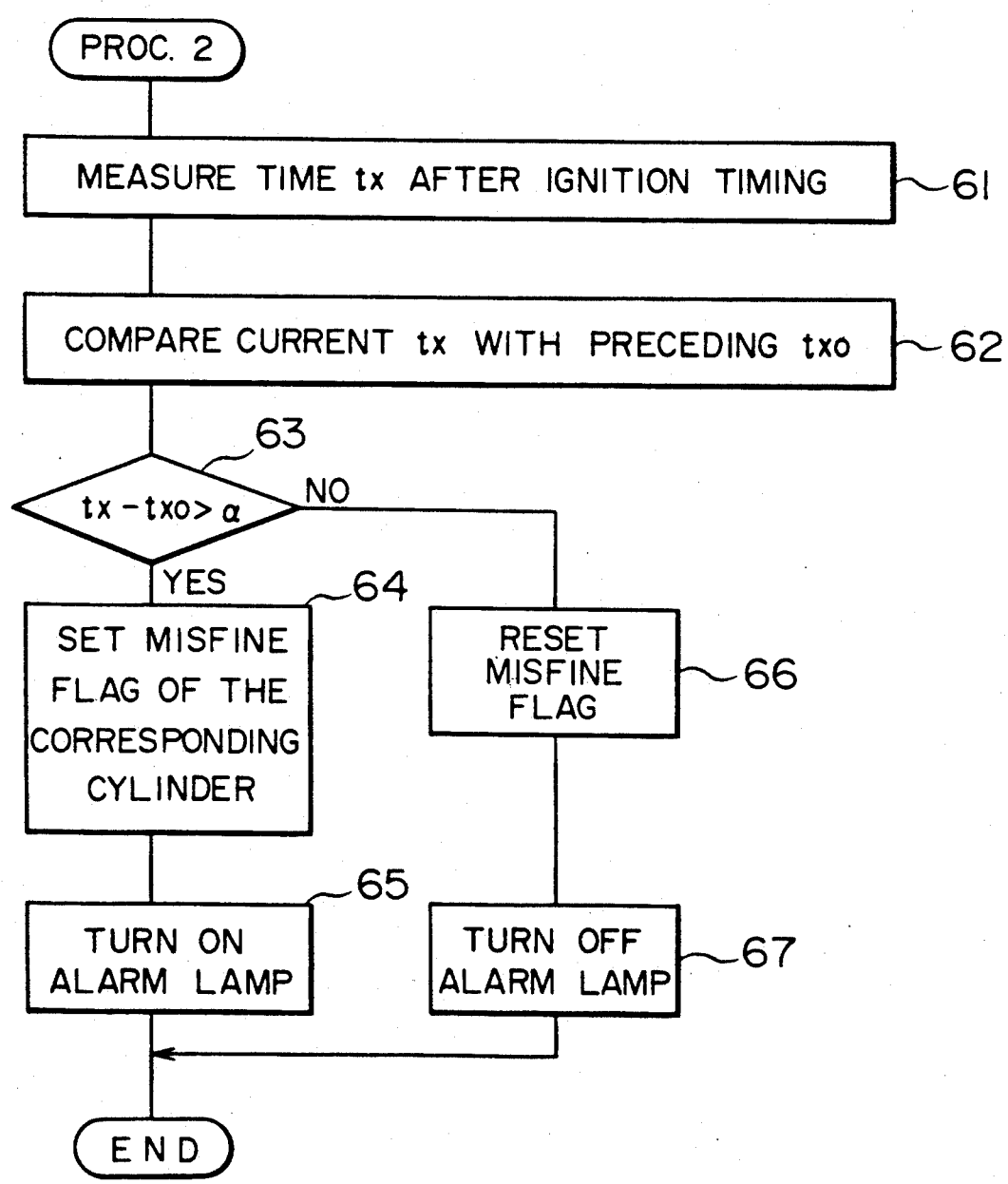
FIG. 6 is a flowchart showing a procedure by which occurrences of misfires are detected on the basis of the deviation (variation) of the time length $t_x$ according to the first aspect of this invention.

FIG. 6 is a flowchart showing a procedure by which occurrences of misfires are detected on the basis of the deviation (variation) of the time length $t_x$ according to the first aspect of this invention. At step 61, the control unit 15 measures the time length (the measurement time interval) $t_x$ after the ignition timing, and at the next step 62, compares the current value $t_x$ with the previous value $t_{x0}$. Next, at step 63, the control unit 15 compares the variation, $t_x - t_{x0}$, with a predetermined reference value $\alpha$, to determine whether or not the variation exceeds the predetermined reference value $\alpha$. When the judgment at step 63 is affirmative, the execution proceeds to step 64, where the misfire flag for the corresponding cylinder is set, and further, at step 65, the misfire detection alarm lamp is turned on. On the other hand, when the judgment at step 63 is negative, the misfire flag is reset at step 66, and the misfire detection alarm lamp 19 is turned off at step 67. The misfire can thus be notified by turning on the misfire detection alarm lamp 19.

Figure 7:
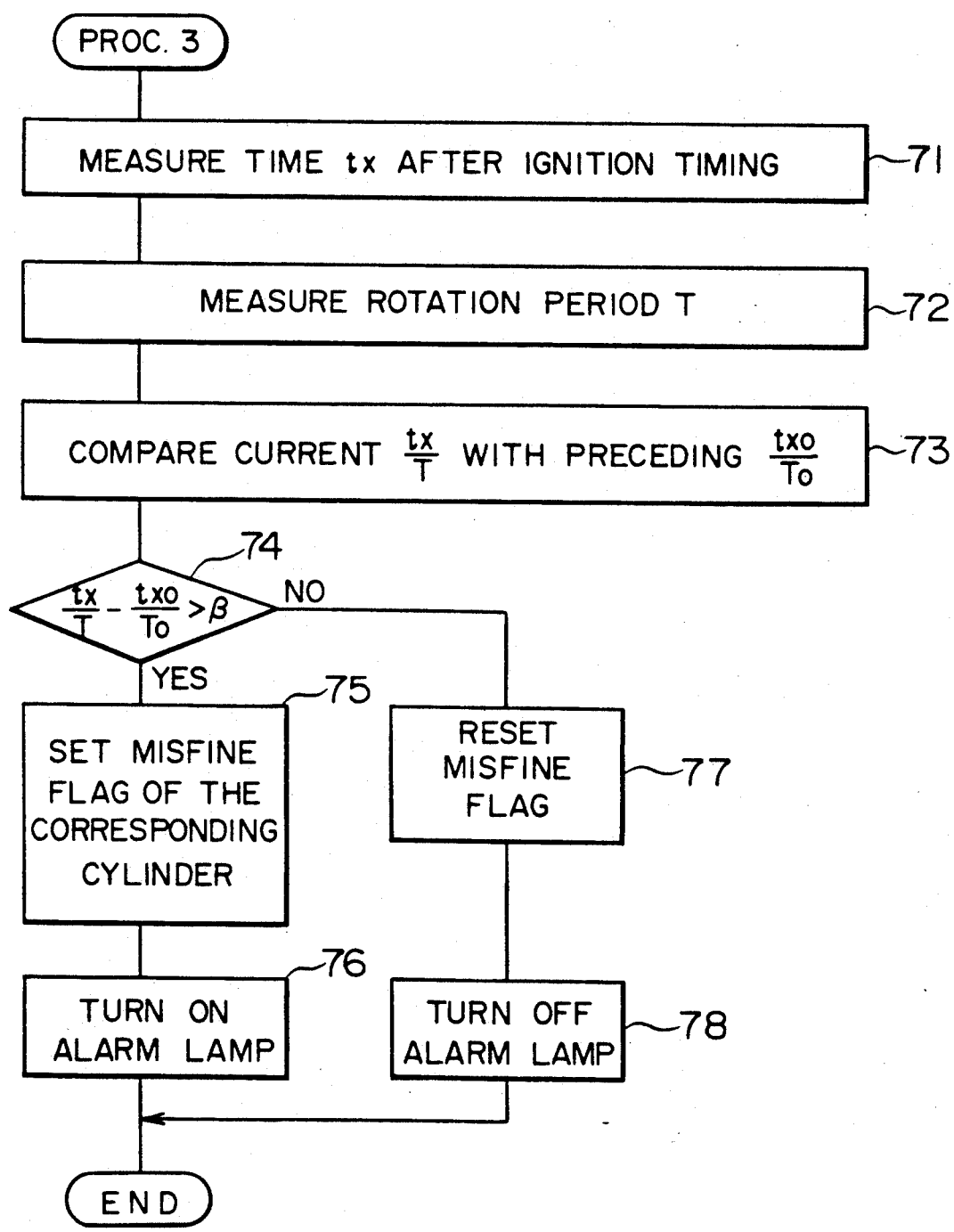
FIG. 7 is a flowchart showing a modified procedure by which occurrences of misfires are detected on the basis of the deviation (variation) of the time length $t_x/T$ according to the first aspect of this invention.

FIG. 7 is a flowchart showing a modified procedure by which occurrences of misfires are detected on the basis of the deviation (variation) of the time length $t_x/T$ according to the first aspect of this invention. The procedure of FIG. 7 is distinguished from that of FIG. 6 in that the time length $t_x$ is divided by the rotation period T, and the misfire detection is effected on the basis of the variation of the ratio $t_x/T$ of time length $t_x$ to the period T. Thus, the procedure is identical to that of FIG. 6 except that the rotation period T of the crank shaft is measured at step 72 on the basis of the rotation signal Sc after the initial step 71 and that the ratio $t_x/T$ of the time length $t_x$ is used instead of the time length $t_x$ itself. At step 74, the variation of the ratio, $t_x/T - t_{x0}/T_0$, is compared with a predetermined reference value represented by $\beta$.

In the above, the description has been made for the case where the misfire is detected on the basis of the time length $t_x$ from the ignition timing to a predetermined crank angle. However, occurrences of misfires may be detected on the basis of the average of the time length $t_x$ for the four cylinders: $t_x = (\frac{1}{4})\Sigma t_{xi}$, where the summation ($\Sigma$) is effected from i=1 to 4, the number of cylinders of the engine.

The physical organization of the misfire detection device according to a second aspect of this invention is identical to that shown in FIG. 1. However, according to the second aspect, the control unit 15 determines the angular velocity (rotation speed) of the crank shaft immediately after the ignition and at a predetermined angles (e.g. 45 degrees) after each ignition, such that the misfiring cylinder is detected on the basis of the variation (increment or decrement) of the angular velocity or the ratio of the angular velocities, as described in detail below. When a misfire is detected, the control unit 15 drives the misfire detection alarm lamp 19 via the alarm lamp driver (RDR) 156. As in the case of the misfire detection device according to the first aspect of this invention, the waveforms of the cylinder distinguishing signal Sb, the rotation signal Sc, the crank angle pulse signal Sd, the ignition signal Se, and the variation of the interior pressure within cylinders are as shown in FIG. 2.

Figure 8:
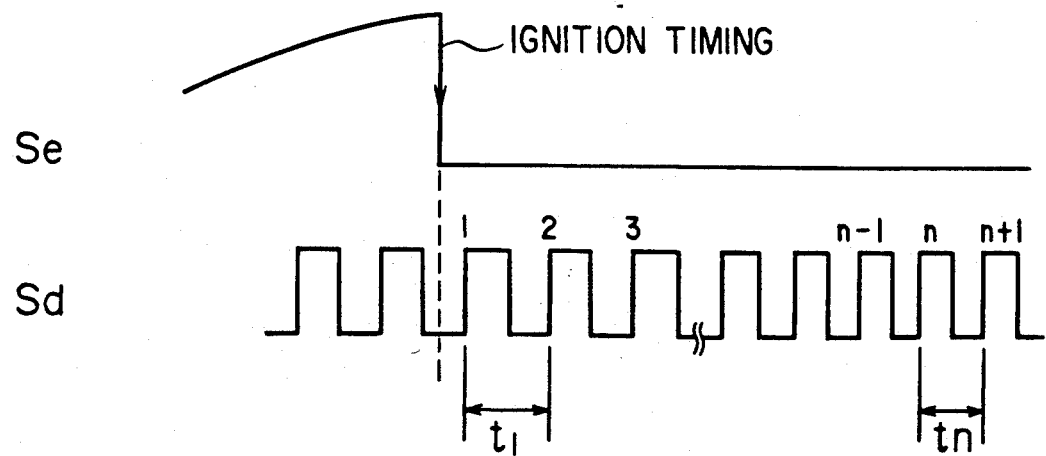
FIG. 8 shows waveforms of the ignition signal Se and the crank angle pulse signal Sd, together with the pulse periods $t_I$ and $t_n$ of the rotation signal Sc which are utilized for detecting the misfires according to the second aspect of this invention.

FIG. 8 shows waveforms of the ignition signal Se and the crank angle pulse signal Sd, together with the pulse periods $t_l$ and $t_n$ of the rotation signal Sc which are utilized for detecting the misfires according to the second aspect of this invention. If the pulse period of the crank angle pulse signal Sd immediately after the ignition is represented by $t_l$ and that at a predetermined angle n, e.g. 45 degrees, after the ignition timing is represented by $t_n$, then the instantaneous angular velocity $\omega_1$ immediately after the ignition and the instantaneous angular velocity $\omega_n$ at n degrees after the ignition timing are represented by the following equations:

$$\omega_l = 2\pi(\text{rad})/\{360(\text{degrees}) \times t_l(\text{second/degree})\} \quad (1)$$

$$\omega_n = 2\pi(\text{rad})/\{360(\text{degrees}) \times t_n(\text{second/degree})\} \quad (2)$$

According to the second aspect of this invention, occurrences of misfires are detected on the basis of the variation, $\Delta\omega_d = \omega_l - \omega_n$, of the angular velocity, or on the basis of the ratio $\Delta\omega_r = \omega_n/\omega_l$, which are represented by the following equations:

$$\Delta\omega_d = \omega_1 - \omega_n \quad (3)$$
$$= (2\pi/360)((1/t_1) - (1/t_n))$$

$$\Delta\omega_r = \omega_n/\omega_1 \quad (4)$$
$$= t_1/t_n$$

Figure 9:
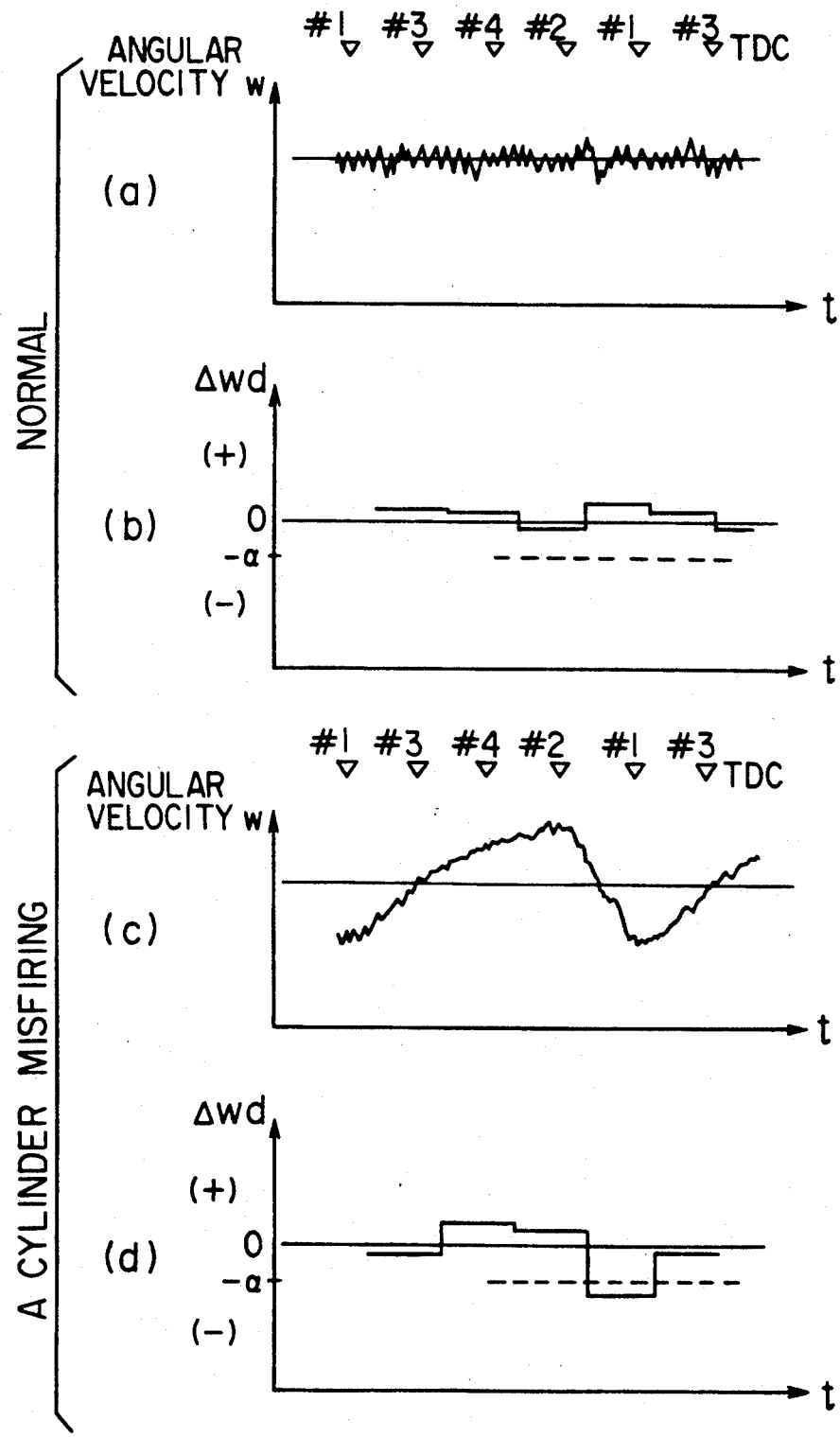
FIG. 9 shows the waveforms of the angular velocity and the variation rate $\Delta\omega_d$ of the angular velocity at the expansion cycles of the cylinders of the engine, utilized according to the second aspect of this invention, for the two cases where the engine is normally operating ((a) and (b)) and where a cylinder is misfiring ((c) and (d))

FIG. 9 shows the waveforms of the angular velocity and the variation rate $\Delta\omega_d$ of the angular velocity at the expansion cycles of the cylinders of the engine, utilized according to the second aspect of this invention, for the two cases where the engine is normally operating ((a) and (b)) and where a cylinder is misfiring ((c) and (d)). From the waveform of $\Delta\omega_d$ as represented at (d), it can be determined that the cylinder #2 is misfiring. The deviation of the variation $\Delta\omega_d$ of the angular velocity from the normal level (represented at 0 in FIG. 9) increases when a cylinder misfires. Thus, according to the second aspect of this invention, an occurrence of misfire is determined on the basis of the measurement of the variation of the angular velocity.

Figure 10:
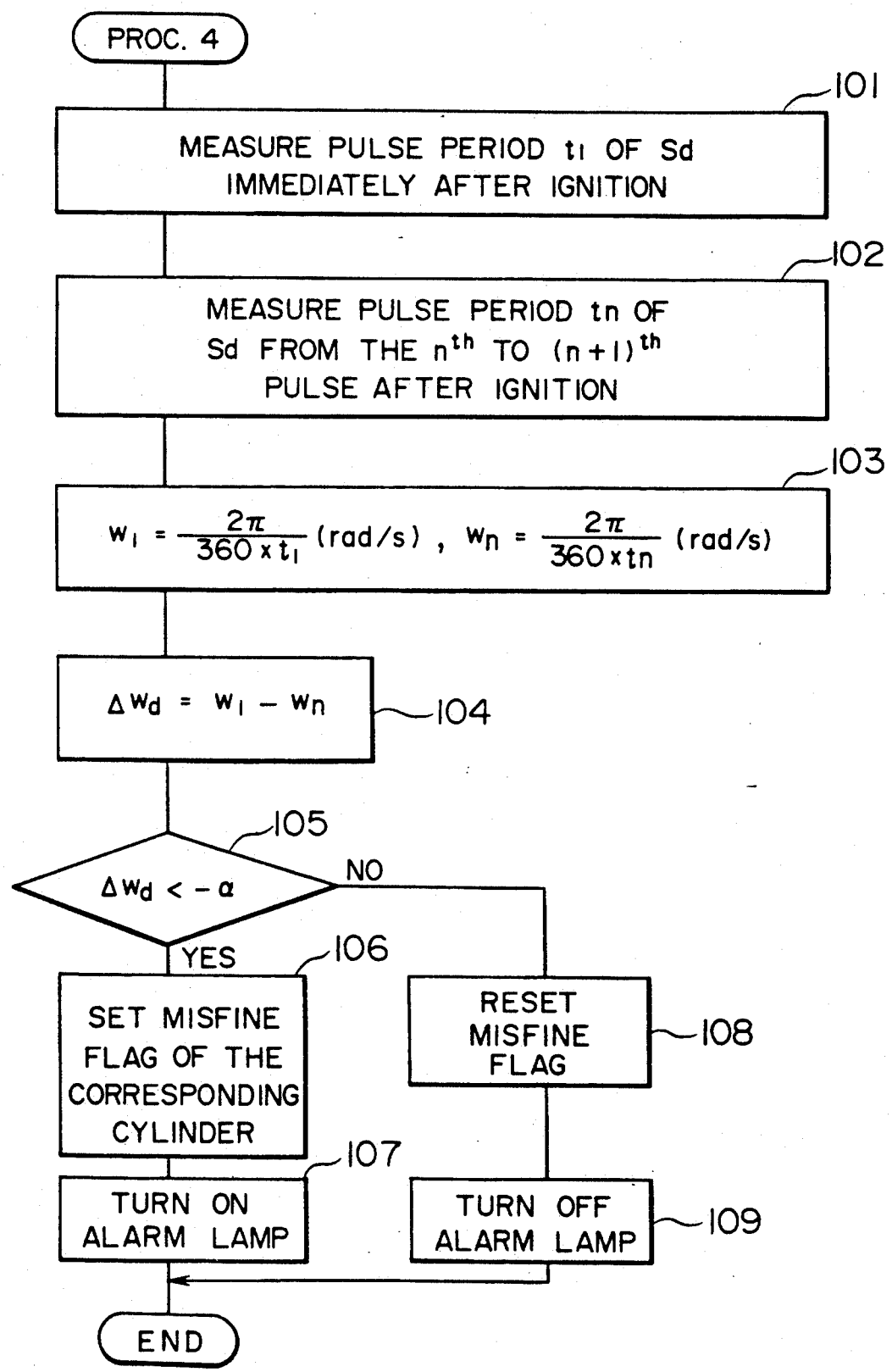
FIG. 10 is a flowchart showing a procedure by which occurrences of misfires are detected on the basis of the variation (increment or decrement) $\Delta\omega_d$ of the angular velocity according to the second aspect of this invention.

FIG. 10 is a flowchart showing a procedure by which occurrences of misfires are detected on the basis of the variation (increment or decrement) $\Delta\omega_d$ of the angular velocity according to the second aspect of this invention. At step 101, the control unit 15 measures the pulse repetition period $t_l$ of the crank angle pulse signal Sd immediately after the ignition timing, and then at the next step 102, it measures the pulse repetition period $t_n$ of the crank angle pulse signal Sd as measured from the $n^{th}$ to the $(n+1)^{th}$ pulse after the ignition (see FIG. 8). Since the pulse repetition period of the crank angle pulse signal Sd corresponds to a fixed angle (e.g. 1 degree) of the crank shaft, the measurement at step 102 is effected at a predetermined angle of crank shaft (e.g. 45 degrees) after the ignition. Further, at step 103, the control unit 15 calculates by means of the above equations (1) and (2) the angular velocity $\omega_l$ immediately after the ignition timing and the angular velocity $\omega_n$ a predetermined angle of the crank shaft after the ignition. At step 104, the variation of the angular velocity, $\Delta\omega_d = \omega_l - \omega_n$, is calculated. Next, at step 105, the control unit 15 compares the variation $\Delta\omega_d$ with a predetermined reference level $-\alpha$, to determine whether or not the variation is less than the predetermined reference level. If the judgment at step 105 is affirmative, the execution proceeds to step 106, where the misfire flag for the corresponding cylinder is set. Thereafter, at step 107, the misfire detection alarm lamp 19 is turned on. On the other hand, when the judgment at step 105 is negative, the execution proceeds to step 108, where the misfire flag is reset, and at step 109, the misfire detection alarm lamp 19 is turned off.

Figure 11:
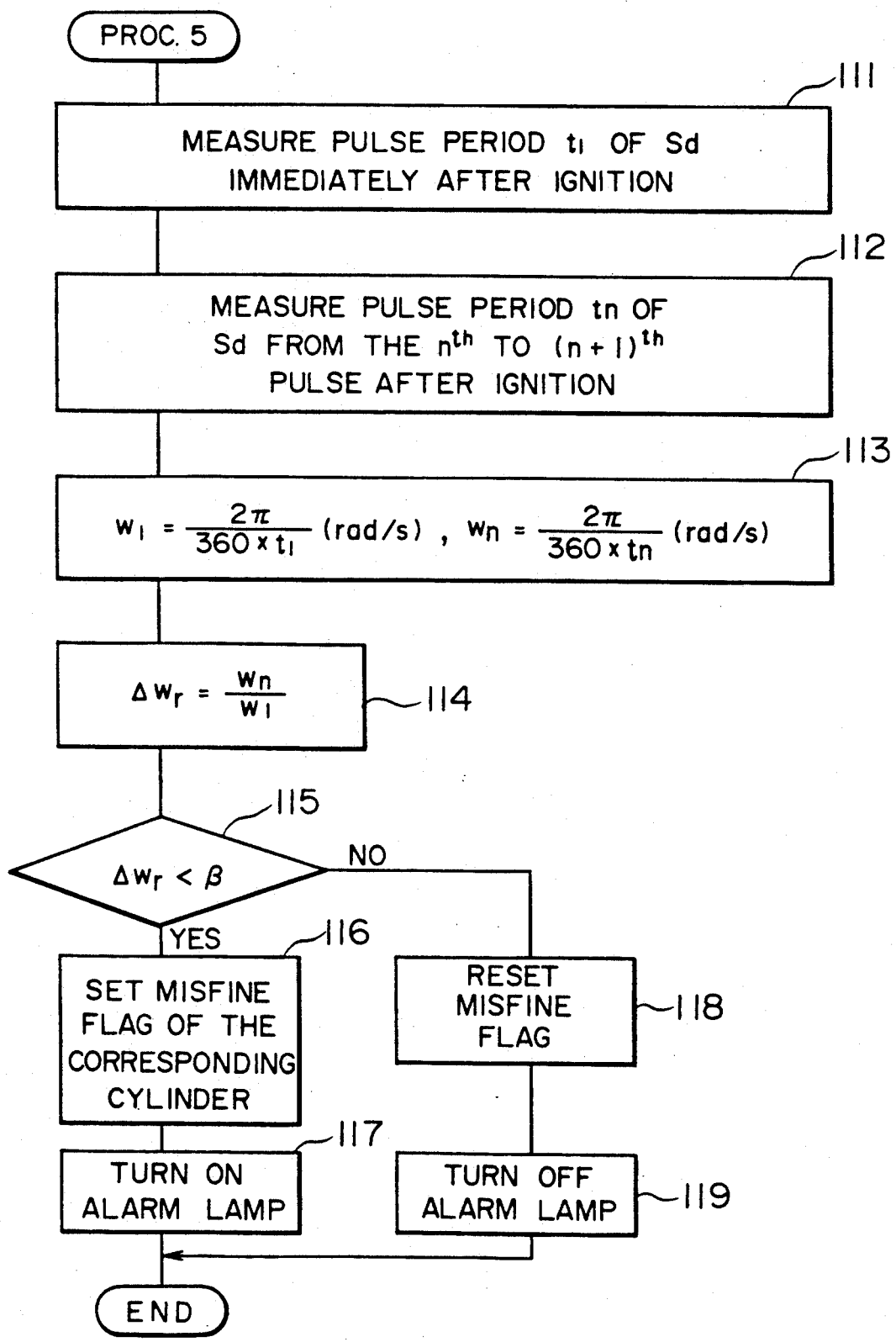
FIG. 11 is a flowchart showing a modified procedure by which occurrences of misfires are detected on the basis of the ratio $\Delta\omega_r$ of the angular velocities according to the second aspect of this invention.

FIG. 11 is a flowchart showing a modified procedure by which occurrences of misfires are detected on the basis of the ratio $\Delta\omega_r$ of the angular velocities according to the second aspect of this invention. The procedure of FIG. 11 is distinguished from that of FIG. 10 in that the misfire detection is effected on the basis of the ratio $\Delta\omega_r = \omega_n / \omega_l$ of the angular velocities $\omega_n$ and $\omega_l$ instead of the variation $\Delta\omega_d = \omega_l - \omega_n$, In other respects, the procedure is similar to that of FIG. 10, and the description is deemed unnecessary. It is noted, however, that at step 115, the ratio $\Delta\omega_r$ is compared with a predetermined reference level represented by $\beta$, to determine whether or not the ratio is less than the predetermined reference level.

What is claimed is:

1. A misfire detection device for an internal combustion engine including ignition signal generation means for generating an ignition timing signal for controlling ignition timings of the internal combustion engine, said misfire detection device comprising:

crank angle signal generation means for generating pulses at predetermined angular intervals of a crank shaft of said internal combustion engine;

time measurement means for measuring a time length from each ignition timing as determined on the basis of said ignition timing signal, to a predetermined crank angle after said ignition timing, as determined on the basis of said pulses of said crank angle signal generation means; and misfire detection means for detecting an occurrence of misfire on the basis of a variation of said time length measured by said time measurement means.

2. A misfire detection device as claimed in claim 1, wherein said misfire detection means includes: means for calculating a difference between said time lengths of a current and a preceding ignition cycle as measured by said time measurement means; and means for comparing said difference with a predetermined reference level, wherein an occurrence of misfire is detected when said difference exceeds said reference level.

3. A misfire detection device as claimed in claim 1, wherein said misfire detection means includes: means for determining each rotation period of said crank shaft; calculation means for calculating a ratio of said time length as measured by said time measurement means, to a rotation period; means for calculating a difference between said ratios of a current and a preceding ignition cycle as calculated by said calculation means; and means for comparing said difference with a predetermined reference level, wherein an occurrence of misfire is detected when said difference exceeds said reference level.

4. A misfire detection device for an internal combustion engine including ignition signal generation means for generating an ignition timing signal for controlling ignition timings of the internal combustion engine, said misfire detection device comprising:

crank angle signal generation means for generating pulses at predetermined angular intervals of a crank shaft of said internal combustion engine;

angular velocity determining means for determining an instantaneous angular velocity of a crank shaft of said internal combustion engine on the basis of said pulses generated by said crank angle signal generation means, said angular velocity determining means determining a first angular velocity in the neighborhood of an ignition timing as determined by said ignition timing signal and a second angular velocity at a predetermined crank angle after said ignition timing; and misfire detection means for detecting an occurrence of misfire on the basis of said first and second angular velocities as determined by said angular velocity determining means.

5. A misfire detection device as claimed in claim 4, wherein said misfire detection means includes: means for calculating a difference between said first and second angular velocity for each ignition cycle of said internal combustion engine; and means for comparing said difference with a predetermined reference level, wherein an occurrence of misfire is detected when said difference is less than said reference level.

6. A misfire detection device as claimed in claim 4, wherein said misfire detection means includes: means for calculating a ratio of said first and second angular velocity for each ignition cycle of said internal combustion engine; and means for comparing said ratio with a predetermined reference level, wherein an occurrence of misfire is detected when said difference is less than said reference level.

7. A misfire detection device as claimed in claim 4, wherein angular velocity determining means determines an instantaneous angular velocity on the basis of a pulse repetition period of said pulses generated by said crank angle signal generation means.

* * * * *